United States Patent [19]

Vinatieri et al.

[11] 4,154,300

[45] May 15, 1979

[54] METHOD OF LOCATING EXTREMA IN MULTICOMPONENT THREE PHASE SYSTEMS

[75] Inventors: James E. Vinatieri; Paul D. Fleming, III, both of Bartlesville, Okla.

[73] Assignee: Phillips Petroleum Company, Bartlesville, Okla.

[21] Appl. No.: 895,429

[22] Filed: Apr. 12, 1978

[51] Int. Cl.$^2$ ............................................. E21B 43/22
[52] U.S. Cl. .................................. 166/252; 73/611 R; 166/274
[58] Field of Search ........... 166/252, 274, 275, 305 R; 73/61.1 R, 61 R

[56] References Cited

U.S. PATENT DOCUMENTS

| | | | |
|---|---|---|---|
| 3,393,051 | 7/1968 | Kerver | 73/61.1 R X |
| 3,467,190 | 9/1969 | Dunlap et al. | 166/252 |
| 3,885,628 | 5/1975 | Reed et al. | 166/252 |
| 3,981,361 | 9/1976 | Healy | 166/275 X |
| 4,008,768 | 2/1977 | Birk | 166/274 |
| 4,066,124 | 1/1978 | Carlin et al. | 166/252 |
| 4,079,785 | 3/1978 | Hessert et al. | 166/273 |

*Primary Examiner*—Stephen J. Novosad
*Assistant Examiner*—Goerge A. Suchfield

[57] ABSTRACT

Extrema in intensive physical properties in a multicomponent fluid system having at least four components, which system exhibits three phases in equilibrium are located by analyzing each of the three phases or an "averaged" representation of the three phases for the concentration of each of the components and thereafter subjecting the resulting analysis to a Gram-Schmidt Orthogonalization to determine the composition of at least one pseudocomponent which is orthogonal to the other components. By this means it is possible to go more quickly in a direction whereby a property in question changes most rapidly. such techniques have wide applicability in optimizing compositions for a desired intensive property such as interfacial tension. This can be useful in designing surfactant systems for oil recovery, for instance.

14 Claims, 1 Drawing Figure

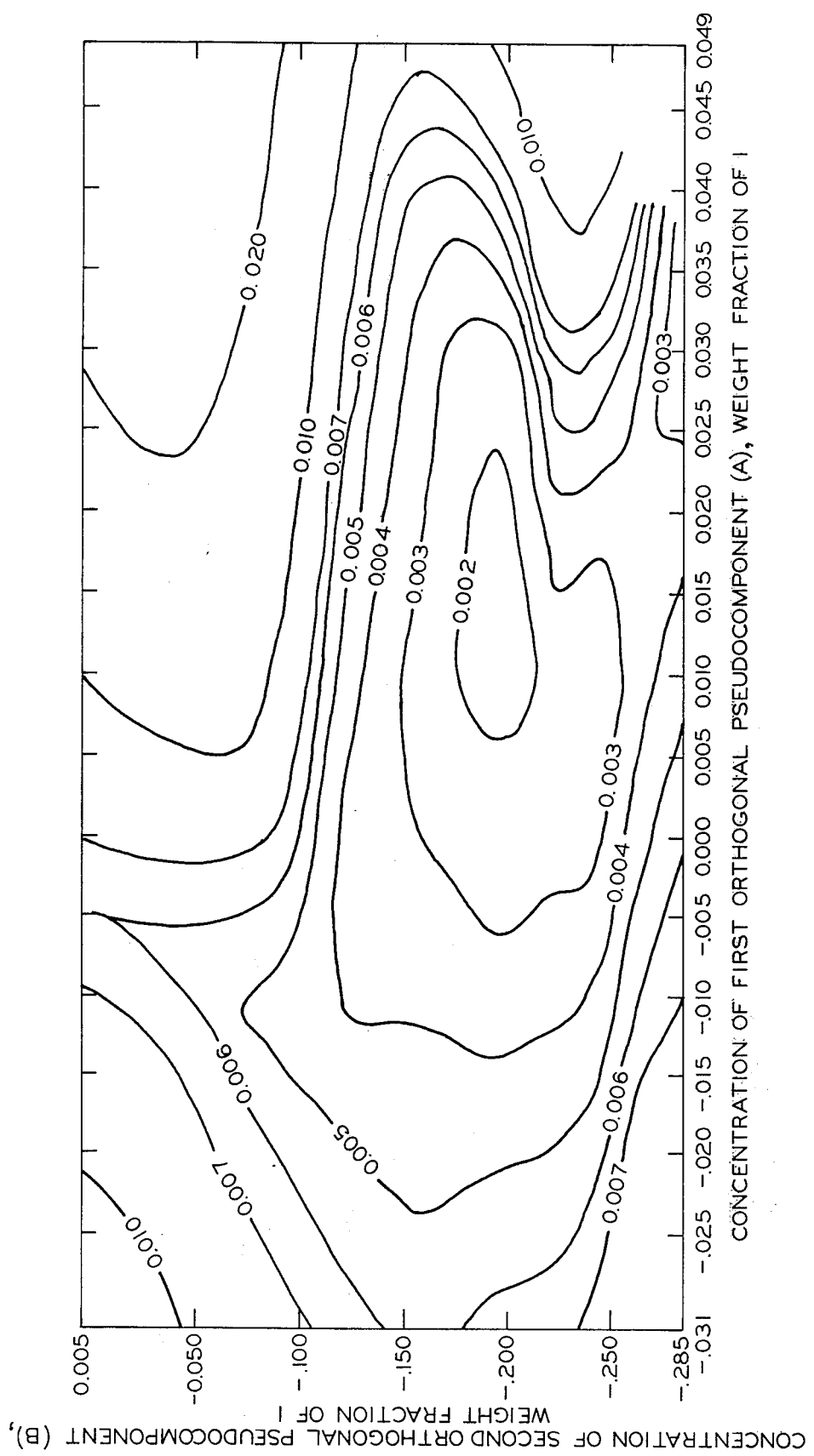

METHOD OF LOCATING EXTREMA IN MULTICOMPONENT THREE PHASE SYSTEMS

BACKGROUND OF THE INVENTION

Surfactant systems have received much attention recently as a means for increasing the recovery of oil from a subterranean reservoir. Typically these systems employ a petroleum sulfonate as the surfactant, and an alcohol as a cosurfactant or cosolvent. Thus, when the oil and brine (water plus electrolyte) are also considered, these oil recovery systems are seen to contain at least five components.

Because of the high cost of surfactant systems, it is important that any such system be optimized to provide the greatest oil recovery at the lowest cost. Unfortunately, this optimization is hindered by, at least, the following three factors:

1. The large number of components and the correspondingly large number of possible compositions which must be evaluated.
2. Interactions between components which make interpolation of behavior difficult.
3. The relative difficulty of performing displacement tests in porous media.

For example, if samples with ten concentrations for each of five variables were prepared, there would be on the order of $10^4$ samples and an optimum would still not be defined. Obviously, it is not feasible to study this many samples, but rather systematic steps must be developed for predicting the behavior of samples with compositions intermediate between the samples which have been studied. Interactions among the various components make such interpolation difficult. For example, if the "optimal salinity" is found while holding the other variables fixed at some value, that salinity will not be optimal when the remaining variables are fixed at another value. Thus it is not feasible to sequentially optimize with respect to each single variable, but rather the ultimate optimum is a function of all variables and must be treated as such.

Compounding the difficulty is the need to evaluate various surfactant systems by oil displacement tests in porous media. These tests are slow and expensive and a substitute test (at least for screening purposes) is highly desirable. For the preferred embodiment herein, the criterion for optimization is taken as a minimization of interfacial tension. Interfacial tension, as related to the capillary number, has been shown to be a key factor in the displacement of residual oil. Furthermore, interfacial tensions can be measured by the spinning drop technique with relative ease. In a three-phase sample there exist three interfacial tensions and since the largest of these is the one which controls the displacement, the optimization scheme must minimize this largest tension by adjusting the composition of the system. While the minimization of interfacial tension may or may not coincide with optional oil recovery, nevertheless low interfacial tension is a necessary condition for achieving high displacement efficiency (under low pressure gradients).

SUMMARY OF THE INVENTION

It is an object of this invention to locate extrema in the intensive physical properties of multicomponent systems;

It is a further object of this invention to reduce the experimental work required to optimize multicomponent systems;

It is yet a further object of this invention to circumvent the difficulty inherent in interaction between components of a multicomponent system which makes optimization difficult; and It is yet a further object of this invention to provide a surfactant system suitable for producing a microemulsion having low interfacial tension for use in oil recovery.

In accordance with this invention, each of three phases of either an actual sample or a composite system determined by regression analysis is analyzed and the resulting analysis subjected to Gram-Schmidt Orthogonalization to determine the composition of at least one pseudocomponent.

BRIEF DESCRIPTION OF THE DRAWING

The drawing, forming a part hereof, is a contour diagram prepared by computer analysis and showing the interpolated lines of identical interfacial tension as a function of two independent pseudocomponents.

DESCRIPTION OF THE PREFERRED EMBODIMENTS

The invention is described herein primarily with respect to the preferred embodiment of a surfactant system comprising oil or a hydrocarbon corresponding to oil such as 1-phenyltetradecane (PTD), water, and an electrolyte such as sodium chloride, a cosurfactant such as isobutyl alcohol (IBA), and a surfactant such as a petroleum sulfonate, the one actually used being a purified form of Witco TRS 10-410 petroleum sulfonate. Although the sulfonate is not a single isometric species, it can be treated as a single component, thus resulting in a five component system.

In order to visualize such a system by means of a tetrahedral diagram, it is necessary to consider at least one pseudocomponent, i.e., two components which are grouped together and considered as one. The most obvious choice for such a pseudocomponent is the mixture of water and electrolyte, i.e., brine. In the prior art, brine has consistently been chosen as a pseudocomponent. In accordance with applicants' invention, it can be shown that in a three-phase, five component system there are three pseudocomponents that do not affect the composition of the phases or the resulting intensive physical properties and there are two pseudocomponents, changes in which effect the most rapid change in the composition of the phases and the resulting intensive physical properties. In accordance with applicants' invention, it will be shown that the "perfect" pseudocomponents for effecting the most rapid change in properties are complex mixtures of certain of the ingredients and not the simple mixture of water and electrolyte. Purely by accident, brine appears to be a good pseudocomponent for representing surfactant systems because the ratio of water to salt in the various phases is essentially the same as the ratio of water to salt in the brine. However, brine is not the pseudocomponent which effects the most rapid change possible in the intensive physical properties of the phases. Another pseudocomponent which has been utilized in the prior art is the mixture of cosurfactant and surfactant. However, this is not a good pseudocomponent because it does not even give a constant ratio in the various phases.

As compared with the apparent optimum conditions achieved by plotting salinity versus interfacial tension, the orthogonal optimization scheme has resulted in not only reducing the interfacial tension by a factor of about 4, but has also increased the viscosity of the microemulsion by 33 percent and has increased the volume of the microemulsion phase by 37 percent. These latter two effects should also benefit oil recovery operations by improving areal sweep efficiency.

A word of explanation is in order with respect to the concept of a pseudocomponent which effects the most rapid possible change in the physical property. A two component system can be represented in one dimension, a three component system in two dimensions, and a four component system in three dimensions. For the two component system there can be no change in the compositions, and hence properties of the phases, in a two-phase region. For a ternary system the compositional direction which effects the greatest possible change in the compositions and properties of the phases in a two-phase system is perpendicular (at a right angle to) the tie line defining the system. For a quaternary two-phase system there are two such perpendiculars and the direction of maximum change from a given point must be in the plane defined by these two perpendiculars which pass through the point. For a quaternary three-phase system, a tie triangle defines the compositions of the phases and the direction of maximum change must be perpendicular to the plane of the tie triangle. For the case of principle interest in oil recovery, a five-component system, a four-dimensional representation is necessary and there are two independent perpendiculars (these "perpendiculars" which exist as a mathematical concept in a fourth dimension, although they cannot be depicted in three dimensions are referred to herein as the orthogonal directions, i.e. the directions which effect the greatest possible change in the composition) to a three-phase tie triangle, just as there were two perpendiculars to a tie line in a quaternary, two-phase system. Thus, as in that case, the compositional direction of maximum change is in the plane defined by two independent perpendiculars when they share a common point.

The intensive physical property of primary interest is interfacial tension or in the case of liquid-gaseous systems, surface tension. Examples of other intensive physical properties are density, viscosity, conductivity and the like. As used herein, intensive physical property means a property which changes continuously as a function of composition.

The analysis of the various phases can be carried out by any standard means well known in the art. In the work set out herein, the phenyltetradecane corresponding to the oil, the isobutyl alcohol cosurfactant, and water were determined by gas chromatography, using a Perkin-Elmer Model 990 gas chromatograph. The phenyltetradecane was analyzed using a 5 foot long by ⅛ inch diameter column with 5 percent OV-101 on 80/100 mesh Chromosorb P. The carrier gas was helium at an inlet pressure of 60 psi. The column temperature was 240° C., the injection port temperature was 250° C., and the detector temperature was 200° C. A hot wire detector was used. Tetrahydrofuran was used as the solvent and n-eicosane was used as an internal standard.

The isobutyl alcohol and water were analyzed using a 20 foot long by ¼ inch diameter column packed with 6% Carbowax 20 M on Teflon 6. Helium was used as the carrier gas at 30 psi inlet pressure. Temperatures of the column, injection port, and detector were 140° C., 200° C., and 200° C., respectively. A hot wire detector was used and the solvent was normal butyl alcohol. The internal standard was isopropyl alcohol. The electrolyte concentration was determined by neutron activation for chloride. The sulfonate was analyzed by a modification of ASTM D-1681-62 Section 28. Hyamine 1622 (Rohm and Haas) was used rather than cetytrimethylammonium bromide as mentioned in Note 6, Section 23.2, p. 261, and no n-butanol was added to the sample as called for in Section 28.2

The invention herein is applicable to any multicomponent system having at least four components which system exhibits three fluid phases in equilibrium. Most preferably, it relates to five component liquid systems. It can also involve two liquid phases and one vapor phase in which case the interface between the gas and liquid would involve a consideration of surface tension which is simply the specific name for interfacial tension between a liquid and a vapor. The number of orthogonal directions will be equal to the number of components minus three, i.e., there will be one orthogonal direction for a four component system, two for a five component system, three for a six and the like.

It is noted that the invention is couched in terms of a method of optimizing to determine the extrema, and in the case of each of the orthogonal directions, there can be either a positive or a negative direction and the one to be utilized would simply depend on whether it was desired to maximize or minimize the intensive property in question. For instance, in accordance with the preferred embodiment herein, the desire is to minimize interfacial tension. However, if the desire were to maximize interfacial tension, then the negative orthogonal direction would be utilized, i.e., instead of adding the pseudocomponent, one would take away the pseudocomponent. This leads to an important practical consideration. Of course, in actually preparing an ultimate composition, it would not be necessary to prepare the initial composition and then physically add a composition corresponding to the pseudocomponent. Rather the composition could simply be prepared initially with the right amounts of all of the ingredients to give a composition equal to the original composition plus or minus the desired amount of the pseudocomponent. For instance, if the pseudocomponent comprised 45 percent water, 41 percent oil, 13 percent salt, and 1 percent alcohol, it would not be necessary to prepare the initial composition and then add an additional mixture having the above ratio of ingredients. Rather the total concentration of each of the ingredients with the desired amount of pseudocomponent added could simply be calculated and the mixture made up initially with the right composition. This is even more readily apparent when a negative amount of pseudocomponent is required. For instance, if a negative 10 percent pseudocomponent is required, the initial composition would not be prepared and then an amount of each of the ingredients extracted corresponding to 10 percent of the pseudocomponent but rather the composition would be made up initially with the composition corresponding to the initial composition minus 10 percent of the pseudocomponent.

Now more specifically in accordance with the preferred embodiment of the present invention, the various physical properties in a three-phase system such as those interfacial tensions existing between a bottom water phase and a middle microemulsion phase, a top oil phase and said middle microemulsion phase, and said bottom water phase and said top oil phase, are optimized, i.e., minimized by the following sequence of steps:

(1) A chemical analysis of each of said three phases (or regression analysis of several) is carried out to determine the amount of each component present in said top, middle, and bottom phases;

(2) the results from (1) are subjected to a Gram-Schmidt Orthogonalization to identify two pseudocomponents, i.e., (A) and (B), the character of (A) and (B) being such that concentration changes therein result in the maximum rate of change in the system's physical property of interest such as interfacial tensions;

(3) in view of the compositional identities of (A) and (B) from above, experimental three-phase samples are prepared having differing values of (A) and/or (B) and the desired physical property, e.g., interfacial tensions are measured;

(4) from the physical property values determined in (3), e.g., interfacial tensions, a correlation between (A), (B), and said physical property such as interfacial tensions is used to identify, e.g., by contour graphical analysis, the optimum value of said physical property such as minimal interfacial tensions.

Hoffman and Kuntz, "Linear Algebra," Prentice-Hall, pages 230-231 (1961), provide a description of Gram-Schmidt orthogonalization, the disclosure of which is hereby incorporated by reference.

The present invention is generally applicable to three-phase systems in which it is desirable to optimize some intensive physical property of the system, e.g., minimization of interfacial tensions. The instant process has usefulness in the area of tertiary oil recovery wherein low interfacial tension between the crude oil in the reservoir and the displacing fluid is very important. A case in point is the minimization of interfacial tension in a surfactant flood process in which an aqueous saline surfactant system comprising water, electrolyte, surfactant and cosurfactant is injected into an oil-bearing subterranean formation to give rise to a three-phase composition in situ comprising brine, microemulsion, and oil which is propagated toward a producing well usually by a thickened water slug and aqueous drive to improve tertiary oil recovery.

A preferred surfactant to be used in accordance with this invention is a petroleum sulfonate having an average equivalent weight within the range of 375 to 500, preferably 400 to 425. The surfactant is used in an amount within the range of 3 to 12, preferably 4 to 8 weight percent based on the weight of the water.

The cosurfactant can be any alcohol, amide, amine, ester, aldehyde or ketone containing 1 to 20 carbon atoms and having a solubility in water within the range of 0.5 to 20, preferably 2 to 10 grams per 100 grams of water. Preferred materials are $C_4$ to $C_7$ alkanols or mixtures thereof. The cosurfactant is utilized in an amount within the range of 1 to 12, preferably 2 to 6 weight percent based on the weight of the water.

The brine constitutes 85 to 95 weight percent of the total composition including brine, surfactant and cosurfactant. The brine is made up of water and an electrolyte which is generally predominantly sodium chloride. The electrolyte is present in the water in an amount within the range of 250 to 100,000, preferably 2,000 to 50,000 parts per million total dissolved solids (TDS). Large amounts of divalent ions are generally undesirable.

The surfactant systems to be contacted with the crude oil should be stable, that is, they should be homogeneous and preferably clear solutions. Such stability is desirable for convenience in storage and handling and stability at the formation temperature is particularly desirable.

About 1-3 parts, generally about 1 part, of surfactant solution and about 1 part of crude oil by weight are equilibrated by any suitable means such as vigorous shaking, vigorous stirring, and the like. The crude oil should be representative of the formation crude into which the surfactant system will be injected. However, for convenience, the gaseous or easily volatilizable components of the crude which might interfere with the small scale equilibrating step, may have been removed. The temperature of the equilibration should approximate the temperature of the formation or at least should be taken into account.

The resulting equilibrated mixture is then allowed to stand undisturbed for about 6 to 24 hours (or less if phase separation occurs sooner) before the phases are decanted for chemical analyses. The temperature of the mixture during this period should also preferably approximate the temperature of the formation to be treated. Such systems are disclosed in Hessert et al U.S. Pat. No. 4,079,785, the disclosure of which is hereby incorporated by reference.

As is known in the art, it is highly desirable that the interfacial tension between the leading edge of said microemulsion and trailing edge of the oil bank approach a minimal value to obtain efficient oil displacement. In one aspect the present invention furnishes a method to design three-phase systems exhibiting minimal interfacial tensions without necessarily carrying out an extremely large number of experiments based solely on trial and error.

The regression analysis referred to hereinabove is a known technique for determining what can be viewed as the "average," it being recognized that the results are not an average in the simple sense of the word. Regression analysis is commercially available from General Electric under the Mark III time sharing service.

In accordance with the preferred embodiment of the present invention, the interfacial tensions existing in any three-phase system are minimized by the step-wise sequence disclosed hereinabove. Such a system can be formulated, e.g., by equilibration of water, electrolyte, surfactant, cosurfactant and oil to give a three-phase system comprising a top phase of oil, a middle microemulsion phase and a bottom water phase. The interfacial tensions of interest exist between oil and microemulsion; microemulsion and water; and water and oil. In a typical aqueous saline surfactant system detailed in Example I, the cosurfactant was isobutyl alcohol, the electrolyte was sodium chloride and the oil was 1-phenyltetradecane.

EXAMPLE I

A 50 g mixture was prepared by combining 1 g isobutyl alcohol (cosurfactant), 1 g petroleum sulfonate having an average equivalent weight of about 420 (Witco Chemical CO. TRS 10-410, surfactant), 17.85 g 1-phenyltetradecane (oil); and 30.75 g of a salt solution containing 2.08 weight percent sodium chloride. This 50 g charge was thoroughly mixed to equilibrate all five components at 30° C. and three phases resulted; an upper oil phase, a middle microemulsion phase, and a bottom water phase. The above salinity of 2.08 weight percent NaCl corresponds to the optimal salinity (minimal interfacial tension) for the equilibrated system water-NaCl-petroleum sulfonate-isobutyl alcohol-1-phenyltetradecane in which the weight ratio of isobutyl alcohol to petroleum sulfonate was arbitrarily fixed at 1:1. However, in the practice of the present invention, it is not necessary to formulate said three-phase system at a particular set of conditions. The composition must, however, comprise three fluid phases.

Inventive Step I (Chemical Analysis)

Chemical analysis of the individual phases in the above equilibrated three-phase composition gave the following results.

Table I

Chemical Analysis of a Three-Phase System*
Containing 1-Phenyltetradecane

| | Wt. % $H_2O$ | Wt. % $PTD^a$ | Wt. % $RSO_3^b$ | Wt. % NaCl | Wt. % $IBA^c$ |
|---|---|---|---|---|---|
| Top Phase (Oil) (PS-1) | 0.0 | 99.19 | 0.04 | 0.10 | 0.67 |
| Middle Phase (Microemulsion) (PS-2) | 52.17 | 33.98 | 10.03 | 0.84 | 2.97 |
| Bottom Phase (Water) (PS-3) | 94.02 | 1.48 | 0.03 | 2.14 | 2.33 |

$^a$PTD represents 1-phenyltetradecane (oil).
$^b$RSO$_3$ represents petroleum sulfonate (surfactant).
$^c$IBA represents isobutyl alcohol (consurfactant).
*The compositions of the three phases are expressed in terms of the psuedocomponents PS-1, PS-2, and PS-3, corresponding to, respectively, the top oil phase, the middle microemulsion phase, and the bottom water phase.

Inventive Step II (Mathematical Treatment)

The above analytical results were treated mathematically in accordance with the known Gram-Schmidt Orthogonalization to identify the additional pseudocomponents, (A) and (B), to which the magnitude of the interfacial tensions in said three-phase systems are most sensitive. The identifying compositions for the two additional pseudocomponents, (A) (also herein designated as PS-4) and (B) (also herein designated as PS-5) are shown in Table II.

Table II

Compositions for Pseudocomponents (A) and (B)
Derived by Gram-Schmidt Orthogonalization

| | (A) (PS-4) | (B) (PS-5) |
|---|---|---|
| Wt. % $H_2O$ | 44.81 | 47 |
| Wt. % NaCl | 12.47 | (none) |
| Wt. % PTD | 41.34 | 43.81 |
| Wt. % $RSO_3$ | (none) | 1.43 |
| Wt. % IBA | 1.38 | 7.20 |

From Table II it can be seen that pseudocomponent (A) is composed of the "true" components water, sodium chloride, 1-phenyltetradecane and isobutyl alcohol whereas pseudocomponent (B) is composed of the "true" components water, 1-phenyltetradecane, petroleum sulfonate and isobutyl alcohol. From Tables I and II, it is evident that the entire system can be described in terms of the five pseudocomponents PS-1; PS-2; PS-3; PS-4; and PS-5.

More specifically, the Gram-Schmidt Orthogonalization is carried out as follows. The phase rule states that such a three-phase, five component system will have two degrees of freedom at constant temperature and pressure, but does not specifically identify what these two compositional degrees of freedom must be. The following shows that there are directions in composition space which maximize the rate of change for these two degrees of freedom.

(1) It is known that, for a three-phase system, changes in overall composition lying within a single tie triangle will cause no change in the compositions of the phases. Thus, there are two compositional degrees of freedom (corresponding to the plane of a tie triangle) which will not affect the compositions of the phases. The two degrees of freedom which will affect the phase compositions must have components outside the plane of the tie triangle, and in fact, the compositional changes which will cause the most rapid change in phase compositions will be perpendicular to the plane. There are infinitely many pairs of such directions in a five component system. A method of determining such a pair is described below.

Since the methods to be employed are general, i.e., not restricted to a five component system, we will consider an arbitrary N component system in our analysis. Suppose we are given a tie triangle, either from chemical analysis of a single overall composition, or from a regression analysis of several compositions in the three-phase region. The corners of this triangle define three pseudocomponents which we represent by vectors. The three vectors are of the form $$\vec{R}_j = \sum_{i=1}^{N} \alpha_{ji} \vec{r}_i, j = 1 \text{ to } 3. \tag{1}$$

The $\alpha_{ji}$ are normalized and positive, i.e., $$\sum_{i=1}^{N} \alpha_{ji} = 1, j = 1 \text{ to } 3 \tag{2a}$$

and $$\alpha_{ji} > 0 \; i=1 \text{ to } N, j=1 \text{ to } 3, \tag{2b}$$

since they correspond to physical compositions.

We wish to find the vector orthogonal to the triangle and contained in the subspace determined by the triangle and a corner of the N component diagram. If we label this corner by q, then we need to find the unique perpendicular to the triangle contained in the three-dimensional space defined by the tips of the $\vec{R}_j$ and $\vec{r}_q$. The centroid of the triangle is given by $$\vec{R} = \frac{1}{3} \sum_{j=1}^{3} \vec{R}_j = \frac{1}{3} \sum_{j=1}^{3} \sum_{i=1}^{N} \alpha_{ji} \vec{r}_i \tag{3}$$

We then need to determine the vector of the form $$\vec{R} = \sum_{j=1}^{4} \chi_j \vec{R}_j, \tag{4}$$

which satisfies $$\vec{R} \cdot \vec{R}_j = 0, j=1 \text{ to } 3, \tag{5}$$

where $$\vec{R}_j = \vec{R}_j - \vec{R}, j=1 \text{ to } 3$$

and $$\vec{R}_4 = \vec{r}_q - \vec{R}.$$

The $\chi_j$ will be assumed to be normalized, $$\sum_{j=1}^{4} X_j = 1, \quad (6)$$

for convenience.

Substituting (4) into (5) and eliminating $\chi_4$ using (6) we obtain $$\vec{R}_j \cdot \left[ \sum_{j=1}^{3} (\vec{R}_j - \vec{R}_4)\chi_j' + \vec{R}_4 \right] = 0 \quad (7)$$

or $$\vec{R}_j \cdot \left[ \sum_{j=1}^{3} (R_j - \vec{r}_q)\chi_j' + \vec{R}_4 \right] = 0. \quad (8)$$

Since by definition, $\sum_{j=1}^{3} R_j = 0$, we have $$\vec{R}_j \cdot \sum_{j=1}^{3} (\vec{R}_j - \vec{r}_q)\tilde{\chi}_j = 0, \quad (9)$$

where $$\tilde{\chi}_j = \chi_j - \tfrac{1}{3}.$$

We can rewrite (9) as $$\sum_{j=1}^{3} a_{jj}^{o} \tilde{\chi}_j = 0, \quad (10)$$

where $$a_{jj}^{o} = (\vec{R}_j - \vec{R}) \cdot (\vec{R}_j - \vec{r}_q).$$

Equation (10) says that $\chi_j$ must be of the form $$\chi_j = \tfrac{1}{3} + \lambda \psi_j, \; j=1 \text{ to } 3, \quad (11)$$

where $\psi_j$ is an eigenvector of $a^\circ$. From the normalization of the $\chi_j$, $\chi_4$ is given by $$X_4 = 1 - \sum_{j=1}^{3} X_j = -\lambda \sum_{j=1}^{3} \psi_j. \quad (12)$$

Without loss of generality we can take $$\sum_{j=1}^{3} \psi_j = 1,$$

so that $$\lambda = -\chi_4. \quad (13)$$

This is possible so long as $$\sum_{j=1}^{3} \psi_j$$

is non-zero. It must be non-zero since otherwise it would mean that $\chi_4 = 0$, and hence that $\vec{R}$ both lies in the triangle and is perpendicular to it, which is impossible. Thus, we take $\psi_j$ to be normalized to sum to unity. Equation 13 then becomes $$\chi_j = \tfrac{1}{3} - \chi_4 \psi_j, \; j=1 \text{ to } 3. \quad (14)$$

The pseudocomponent defined by $\vec{R}$ is given by $$\vec{R}_4 = \vec{R} + \vec{R} = \sum_{i=1}^{N} \alpha_{4i} \vec{r}_i, \quad (15)$$

where $$\alpha_{4i} = \sum_{j=1}^{3} \chi_j a_{ji} + \chi_4 \delta_{qi} \quad (16)$$

$$= \sum_{j=1}^{3} (\tfrac{1}{3} - \chi_4 \psi_j) a_{ji} + \chi_4 \delta_{qi},$$

with $\delta_{qi}$ being the Kronecker delta. We wish to find the choice for $\alpha_{4i}$ such that this pseudocomponent is on the boundary of the diagram. For this case we must have $$\alpha_{4i} > 0 \text{ for all } i \quad (17a)$$

but also $$\alpha_{4i'} = 0 \text{ for some } i'. \quad (17b)$$

We define $\chi_4^i$ by $$\chi_4^i = \frac{\tfrac{1}{3} \sum_{j=1}^{3} a_{ji}}{\sum_{j=1}^{3} \psi_j a_{ji} - \delta_{qi}}. \quad (18)$$

Consider all $\alpha_{4i}$ of the form $$\alpha_{4i} = \sum_{j=1}^{3} (\tfrac{1}{3} - \chi_4^{i'} \psi_j) a_{ji} + \chi_4^{i'} \delta_{qi} \quad (19)$$

and choose $i'$ such that conditions (17) are satisfied. There will, in general, be two values of $i'$ satisfying (17). Of these two we choose the one having the larger value of $(\vec{R}_4 - \vec{R})^2 = \vec{R}^2$, which is of the form $$\vec{R}^2 = \tfrac{1}{2} \sum_{i=1}^{N} (\alpha_{4i} - \sum_{j=1}^{3} a_{ji})^2. \quad (20)$$

The following is a list of definitions for the above symbols:

NOMENCLATURE i,j—Summation indices
N—Number of components in the system
q—Label for a particular pure component corner of the phase diagram
$\vec{R}_j$—Vector representing jth pseudocomponent
$\vec{R}$—Vector representing centroid of tie triangle
$\vec{R}_j = \vec{R}_j - \vec{R}$ for $j=1$ to 3
$\vec{R}_4 = \vec{r}_q - \vec{R}$
$\vec{R}$—Defined by equations 4 and 5
$\vec{r}_i$—Vector representing ith pure component
$a_{ji}$—Element of matrix defining pseudocomponents
$a_{jj}^o$—Defined in equation 10
$\delta_{qi}$—Kronecker delta=1 if $q=i$ and zero otherwise
$\lambda$—Proportionality constant in equation 11
$\Sigma$—Summation symbol
$\chi_j$—Defined by equations 4 and 5
$\tilde{\chi}_j = \chi_j - \tfrac{1}{3}$
$\chi_4^{i'}$—Defined by equation (18)

Thus, a forth pseudocomponent can be found by straightforward algebraic method. Additional pseudocomponents can be obtained in a similar manner. For the case of interest here, N=5, the second orthogonal direction and hence the fifth pseudocomponent can be obtained as the intersection with the boundary of the pentatope of the second perpendicular through the centroid of the tie triangle. Again, there will be two such pseudocomponents, but we will always take the one which is farther from the centroid.

One complication which arises in this analysis is that, as the overall composition is varied along either of the orthogonal directions, a stack of tie triangles will be intersected. These triangles may be tilted with respect to one another and hence a line perpendicular to the original tie triangle may not be perpendicular to subsequent triangles. This need not be true in general, but for reasonably small compositional changes in the neighborhood of the given triangle, we would expect that the original directions remain nearly orthogonal to the generated triangles.

Inventive Step III

Preparation of Experimental Samples With Variations in (A) (PS-4) and/or (B) (PS-5)

Additional experimental samples containing differing (A) (PS-4) and/or (B) (PS-5) pseudocomponents were prepared for interfacial tensions measurements. The materials charged and the sample compositions in terms of the "true" components are shown in Tables III and V.

In Table IV and V the samples are described in terms of the pseudocomponents (A) and (B), and the interfacial tensions are given for several of the samples. The variation of pseudocomponents (A) (PS-4) and (B) (PS-5) is shown in part (C) of Table IV and also for several samples in Table V.

Table III

1-Phenyltetradecane Samples for Interfacial Tension Measurements[#]

| Sample No. | Reagent Quantities Used in Preparing Samples (grams) | | | | Sample Weight | Compositions of the Experimental Samples (Wt. %) | | | | |
|---|---|---|---|---|---|---|---|---|---|---|
| | BRINE[a] | PTD[b] | RSO$_3$[c] | IBA[d] | | H$_2$O | PTD | RSO$_3$ | NaCl | IBA |
| 1 | 30.135 | 16.658 | 0.25 | 2.965 | 50.0 | 59.01 | 33.31 | 0.51 | 1.25 | 5.93 |
| 2 | 30.34 | 16.855 | 0.50 | 2.31 | 50.0 | 59.41 | 33.71 | 1.00 | 1.26 | 4.62 |
| 3 | 30.545 | 17.052 | 0.75 | 1.655 | 50.0 | 59.82 | 34.10 | 1.50 | 1.27 | 3.31 |
| 4 | 30.648 | 17.15 | 0.875 | 1.328 | 50.0 | 60.02 | 34.30 | 1.75 | 1.27 | 2.66 |
| 5[e] | 30.75 | 17.85 | 1.00 | 1.00 | 50.0 | 60.22 | 34.50 | 2.00 | 1.28 | 2.00 |
| 6 | 30.791 | 17.29 | 1.05 | 0.869 | 50.0 | 60.30 | 34.58 | 2.10 | 1.28 | 1.74 |
| 7 | 30.832 | 17.33 | 1.10 | 0.738 | 50.0 | 60.38 | 34.66 | 2.20 | 1.28 | 1.48 |
| 8 | 30.873 | 17.368 | 1.15 | 0.607 | 50.0 | 60.46 | 34.74 | 2.30 | 1.28 | 1.21 |
| 9 | 30.914 | 17.408 | 1.20 | 0.476 | 50.0 | 60.54 | 34.82 | 2.40 | 1.29 | 0.95 |
| 10 | 30.955 | 17.448 | 1.25 | 0.345 | 50.0 | 60.62 | 34.90 | 2.50 | 1.29 | 0.69 |
| 11 | 1.4 | SS* | SS* | SS* | 39.30 | 60.97 | 34.82 | 2.40 | 0.87 | 0.95 |
| 12 | 1.6 | * | * | * | 39.30 | 60.84 | 34.82 | 2.40 | 0.99 | 0.95 |
| 13 | 1.8 | * | * | * | 39.30 | 60.72 | 34.82 | 2.40 | 1.11 | 0.95 |
| 14 | 1.85 | * | * | * | 39.30 | 60.69 | 34.82 | 2.40 | 1.14 | 0.95 |
| 15 | 1.90 | * | * | * | 39.30 | 60.66 | 34.82 | 2.40 | 1.17 | 0.95 |
| 16 | 1.95 | * | * | * | 39.30 | 60.63 | 34.82 | 2.40 | 1.21 | 0.95 |
| 17 | 2.0 | * | * | * | 39.30 | 60.60 | 34.82 | 2.40 | 1.24 | 0.95 |
| 18 | 2.2 | * | * | * | 39.30 | 60.47 | 34.82 | 2.40 | 1.36 | 0.95 |
| 19 | 2.4 | * | * | * | 39.30 | 60.35 | 34.82 | 2.40 | 1.48 | 0.95 |
| 20 | 2.6 | * | * | * | 39.30 | 60.22 | 34.82 | 2.40 | 1.61 | 0.95 |
| 21 | 2.8 | * | * | * | 39.30 | 60.10 | 34.82 | 2.40 | 1.73 | 0.95 |

[#]The indicated components were equilibrated to give respectively 50 g samples (1–10) consisting of three phases and for samples 11–21 a 24.30 g aliquot of the designated brine was equilibrated with 15 g aliquots of oil solution (see * below) for the nature of the oil stock solution used to prepare samples 11–21.
*A 15 g aliquot of stock oil solution was used in each sample 11–21. The stock oil solution was prepared by combining 9.6 g petroleum sulfonate (Witco Chem. Co. 10-410), 3.8 g isobutyl alcohol, and 139.28 g 1-phenyltetradecane.
[a]The brine used to prepare the samples 1–10 contained 2.08 weight percent NaCl; Samples 11–21 were prepared with brines of 1.4 to 2.8 wt. % NaCl as designated.
[b]PTD represents 1-phenyltetradecane (oil).
[c]RSO$_3$ represents petroleum sulfonate (surfactant).
[d]IBA represents isobutyl alcohol (cosurfactant).
[e]Preparation of sample 5 is described in Example I and the analysis thereof shown in Table I is repeated at the beginning of Table IV.

TABLE IV

1-Phenyltetradecane Samples: Pseudocomponents and Interfacial Tensions (a) Compositions of Pseudocomponents Based on Chemical Analysis

| | H$_2$O | PTD | RSO$_3$ | NaCl | IBA | |
|---|---|---|---|---|---|---|
| PS-1 | 0.0 | 0.9919 | 0.04 | 0.10 | 0.67 | (Top Phase) |
| PS-2 | 0.5217 | 0.3398 | 0.1003 | 0.0084 | 0.0297 | (Middle Phase) |
| PS-3 | 0.9402 | 0.0148 | 0.0003 | 0.0214 | 0.0233 | (Bottom Phase) |

(b) Compositions of Pseudocomponents Derived by Gram-Schmidt Orthogonalization

| | H$_2$O | PTD | RSO$_3$ | NaCl | IBA |
|---|---|---|---|---|---|
| (A) (PS-4) | 44.81 | 41.34 | 0.00 | 12.47 | 1.38 |
| (B) (PS-5) | 47.55 | 43.81 | 1.43 | 0.00 | 7.20 |

(c) Compositions of Samples in Terms of Pseudo-Components

| Sample No. | (PS-1)* | (PS-2)* | (PS-3)* | (PS-4)* | (PS-5)* | Interfacial Tensions[Q] (dyne/cm) | | |
|---|---|---|---|---|---|---|---|---|
| | | | | | | B-M | M-T | B-T |
| 1 | −0.0074 | −0.0589 | 0.2485 | 0.0619 | 0.7559 | NM[P] | NM[P] | NM[P] |
| 2 | 0.0865 | 0.0262 | 0.3435 | 0.0398 | 0.5039 | NM[P] | NM[P] | NM[P] |

TABLE IV-continued

| | | | | | | | | |
|---|---|---|---|---|---|---|---|---|
| 3 | 0.1805 | 0.1113 | 0.4386 | 0.0176 | 0.2519 | NM$^P$ | NM$^P$ | NM$^P$ |
| 4 | 0.2274 | 0.1538 | 0.4861 | 0.0066 | 0.1261 | NM$^P$ | NM$^P$ | NM$^P$ |
| 5 | 0.2745 | 0.1964 | 0.5337 | −0.0045 | −0.0001 | 0.0076 | 0.010 | 0.009 |
| 6 | 0.2933 | 0.2134 | 0.5527 | −0.0089 | −0.0505 | 0.0050 | 0.007 | 0.006 |
| 7 | 0.3121 | 0.2305 | 0.5717 | −0.0134 | −0.1009 | NM$^P$ | NM$^P$ | NM$^P$ |
| 8 | 0.3308 | 0.2475 | 0.5908 | −0.0178 | −0.1513 | 0.0018 | 0.0044 | 0.0023 |
| 9 | 0.3497 | 0.2645 | 0.6098 | −0.0222 | −0.2017 | 0.00022 | 0.0050 | 0.0041 |
| 10 | 0.3685 | 0.2815 | 0.6288 | −0.0266 | −0.2521 | TLTM$^o$ | 0.0076 | 0.0023 |
| 11 | 0.3530 | 0.2645 | 0.6145 | −0.0295 | −0.2026 | NM$^P$ | NM$^P$ | NM$^P$ |
| 12 | 0.3518 | 0.2645 | 0.6128 | −0.0267 | −0.2025 | NM$^P$ | NM$^P$ | NM$^P$ |
| 13 | 0.3417 | 0.2645 | 0.6059 | −0.0156 | −0.2019 | 0.00044 | 0.0037 | 0.0016 |
| 14 | 0.3423 | 0.2645 | 0.5991 | −0.0044 | −0.2014 | 0.0013 | 0.0020 | 0.0020 |
| 15 | 0.3375 | 0.2644 | 0.5922 | 0.0067 | −0.2008 | 0.0011 | 0.0018 | 0.0013 |
| 16 | 0.3328 | 0.2644 | 0.5853 | 0.0178 | −0.2003 | 0.0020 | 0.0014 | 0.0026 |
| 17 | 0.3316 | 0.2644 | 0.5836 | 0.0206 | −0.2001 | NM$^P$ | NM$^P$ | NM$^P$ |
| 18 | 0.3304 | 0.2644 | 0.5819 | 0.0234 | −0.200 | NM$^P$ | NM$^P$ | NM$^P$ |
| 19 | 0.3292 | 0.2644 | 0.5801 | 0.0262 | −0.1999 | NM$^P$ | NM$^P$ | NM$^P$ |

$^Q$B-M, M-T, and B-T represent, respectively, bottom-middle; middle-top; and bottom-top.
$^P$NM represents not measured.
$^o$TLTM represents too low to measure.
*The experimental samples can be described completely in terms of the five pseudocomponents: PS-1, PS-2, PS-3, PS-4 and PS-5. The orthogonalization mathematical treatment indicated that pseudocomponents PS-4 and PS-5 were of the greatest criticality in regard to the magnitude of the interfacial tensions.

TABLE V

1-Phenyltetradecane Samples for Interfacial Tension Measurements

| Sample No. | Reagent Quantities Used in Preparing Samples | | | | Sample Weight | Composition of Samples (Wt. %) | | | | |
|---|---|---|---|---|---|---|---|---|---|---|
| | BRINE$^{(a)}$ | PTD | RSO$_3$ | IBA | | H$_2$O | PTD | RSO$_3$ | NaCl | IBA |
| 22 | 2.2 | SS* | SS* | SS* | 40.39 | 60.54 | 34.88 | 2.48 | 1.36 | 0.74 |
| 23 | 2.4 | * | * | * | 40.39 | 60.41 | 34.88 | 2.48 | 1.49 | 0.74 |
| 24 | 2.6 | * | * | * | 40.39 | 60.29 | 34.88 | 2.48 | 1.61 | 0.74 |
| 25 | 3.0 | * | * | * | 40.39 | 60.04 | 34.88 | 2.48 | 1.86 | 0.74 |
| 26 | 3.2 | * | * | * | 40.39 | 59.92 | 34.88 | 2.48 | 1.98 | 0.74 |
| 27 | 2.6 | # | # | # | 40.343 | 60.36 | 34.95 | 2.57 | 1.61 | 0.51 |
| 28 | 3.0 | # | # | # | 40.343 | 60.11 | 34.95 | 2.57 | 1.86 | 0.51 |
| 29 | 3.2 | # | # | # | 40.343 | 59.99 | 34.95 | 2.57 | 1.98 | 0.51 |

| Sample No. | Sample Compositions in Terms of Pseudocomponents | | | | | Interfacial Tensions (dyne/cm) | | |
|---|---|---|---|---|---|---|---|---|
| | PS-1 | PS-2 | PS-3 | PS-4 | PS-5 | B-M | M-T | B-T |
| 22 | 0.3617 | 0.2779 | 0.6208 | −0.0190 | −0.2414 | NM | NM | NM |
| 23 | 0.3570 | 0.2778 | 0.6139 | −0.0079 | −0.2409 | 0.00074 | 0.0069 | NM |
| 24 | 0.3522 | 0.2778 | 0.6070 | 0.0032 | −0.2403 | 0.0015 | 0.0011 | NM |
| 25 | 0.3427 | 0.2777 | 0.5933 | 0.0255 | −0.2392 | 0.0046 | 0.00065 | NM |
| 26 | 0.3379 | 0.2777 | 0.5864 | 0.367 | −0.2387 | 0.0096 | 0.00054 | NM |
| 27 | 0.3687 | 0.2929 | 0.6237 | −0.0006 | −0.2847 | 0.00078 | 0.0060 | NM |
| 28 | 0.3592 | 0.2928 | 0.6099 | 0.0217 | −0.2836 | 0.0015 | 0.0033 | NM |
| 29 | 0.3544 | 0.2928 | 0.6030 | 0.0329 | −0.2830 | 0.0021 | 0.0016 | NM |

A 250 g aliquot of the designated brine was equilibrated with 15.39 g aliquots of oil solution (see * below) to prepare samples 22–26. Samples 27–29 involved the use of 25 g aliquots of brine with 15.343 g of oil solution.
*The stock oil solution was prepared by mixing 20.026 g petroleum sulfonate (Witco 10-410), 6.01 g isobutyl alcohol, and 281.768 g 1-phenyltetradecane.
$^{(a)}$The brine used to prepare samples 22–29 contained the designated weight percent NaCl.

From the results in Table IV it can be seen that pseudocomponent (A) (PS-4) varied over the range from 0.0619 to −0.0266 in Samples 1–10 and over the range of −0.0295 to 0.0262 in Samples 11–19, whereas pseudocomponent (B) (PS-5) varied over the range 0.7559 to −0.2521 in Samples 1–10 and over the range of −0.2026 to −0.1999 in Samples 11–19. The maximum of the three interfacial tensions for Samples 1–10 was observed to vary over the range 0.010 to 0.0076, whereas the maximum in Samples 11–19 varied over the range of 0.002 to 0.0037. From the results in Table V it can be seen that pseudocomponent (A) (PS-4) varied over the range from −0.0190 to 0.0367 in Samples 22–26 and over the range of −0.0006 to 0.0329 in Samples 27–29, whereas pseudocomponent (B) (PS-5) varied over the range of −0.2414 to −0.2387 in Samples 22–26 and over the range of −0.2847 to −0.2830 in Samples 27–29.

Exemplary calculations for the interconversion of pseudocomponents and true components are given in Table VI. These calculations are important because the "true" component compositions exhibiting the lowest interfacial tensions are defined graphically in a contour plot of pseudocomponents (A) and (B) versus the experimentally determined interfacial tensions. Thus, from such a contour graph the minimum interfacial tension is expressed as a function of pseudocomponents (A) and (B).

As a case in point, let the graphical values of (A) and (B) be, respectively, 0.1234 and 0.4321, then the sum of PS-4 (A) and PS-5 (B) is 0.5555. Since the sum of PS-1, PS-2, PS-3, PS-4, and PS-5 is 1.0000, the sum of PS-1, PS-2, and PS-3 is 1.000−0.5555 or 0.4445. Assuming that a suitable three-phase system can exhibit for PS-1=PS-2=PS-3, then PS-1=PS-2=PS-3=0.4445/3 or 0.1482. Thus, an optimal system designated as such is described by the pseudocomponents:

Table VI

| PS-1 | PS-2 | PS-3 | PS-4 | PS-5 |
|---|---|---|---|---|
| 0.1482 | 0.1482 | 0.1482 | 0.1234 | 0.4321 |

Exemplary Calculations for Interconversion of Pseudocomponents and True Components

| Sample No. | PS-1 | PS-2 | PS-3 | PS-4 | PS-5 |
|---|---|---|---|---|---|
| 1 | −0.0074 | −0.0589 | 0.2485 | 0.0619 | 0.7559 |

(a) To calculate total $H_2O$ in Sample 1 (59.01 wt. % water, see Table III)

|  |  |  |  | $H_2O$ | PTD | $RSO_3$ | NaCl | IBA |
|---|---|---|---|---|---|---|---|---|
| −0.0074 × 0.0 | = | 0.0 | PS-1 | 0.0 | 0.9919 | 0.0004 | 0.0010 | 0.0067 |
| −0.0589 × 0.5217 | = | −.0307 | PS-2 | 0.5217 | 0.3398 | 0.1003 | 0.0084 | 0.0297 |
| 0.2485 × 0.9402 | = | 0.2336 | PS-3 | 0.9402 | 0.0148 | 0.0003 | 0.0214 | 0.0233 |
| 0.0619 × 0.4481 | = | 0.0277 | PS-4 | 0.4481 | 0.4134 | 0.0 | 0.1247 | 0.0138 |
| 0.7559 × 0.4755 | = | 0.3594 | PS-5 | 0.4755 | 0.4381 | 0.0143 | 0.0 | 0.0720 |
|  |  | 0.5900 |  |  |  |  |  |  |

Wt. % = 59.0

(b) To calculate total PTD in Sample 1 (33.31 wt. % PTD, See Table III)

$$-0.0074 \times 0.9919 = -.0073$$
$$-0.0589 \times 0.3398 = -.0200$$
$$0.2485 \times 0.0148 = 0.0037$$
$$0.0619 \times 0.4134 = 0.0256$$
$$0.7559 \times 0.4381 = 0.3312$$
$$0.3332$$

Wt. % = 33.32

(c) To calculate total $RSO_3$ in Sample 1 (0.50 wt. % RSO, see Table III)

$$-0.0074 \times 0.0004 = 0.0$$
$$-0.0589 \times 0.1003 = -.0059$$
$$0.2485 \times 0.0003 = 0.0001$$
$$0.0619 \times 0.0 = 0.0$$
$$0.7559 \times 0.0143 = 0.0108$$
$$0.005$$

Wt. % = 0.50

(d) To calculate total NaCl in Sample 1 (1.25 wt. % NaCl, see Table III)

$$-0.0074 \times 0.0010 = 0.0$$
$$-0.0589 \times 0.0084 = -.0005$$
$$0.2485 \times 0.0214 = 0.0053$$
$$0.0619 \times 0.1247 = 0.0077$$
$$0.7559 \times 0.0 = 0.0$$
$$0.0125$$

Wt. % = 1.25

(e) To calculate total IBA in Sample 1 (5.93 wt. % IBA, see Table III)

$$-0.0074 \times 0.0067 = 0.0$$
$$-0.0589 \times 0.0297 = -.0017$$
$$0.2485 \times 0.0233 = 0.0058$$
$$0.0619 \times 0.0138 = 0.0008$$
$$0.7559 \times 0.0720 = 0.0544$$
$$0.0593$$

Wt. % = 5.93

In order to calculate the "true" component composition corresponding to the above pseudocomponents PS-1, PS-2, PS-3, PS-4, and PS-5, a calculation is carried out as shown in Table V. It is to be noted that the values of PS-1, PS-2, and PS-3 can vary over a range with the proviso, of course, that all the described systems exhibit three phases. In other words, more than one system can be formulated which will exhibit minimal interfacial tensions among the three phases.

EXAMPLE II

In order to further illustrate the instant invention, additional samples were prepared with North Burbank Unit crude oil with a blend of petroleum sulfonates from the Phillips pilot plant, brine and isobutyl alcohol. The compositions of the samples in terms of true components are given in Table VII whereas in Table VIII samples are described in terms of pseudocomponents along with the corresponding interfacial tensions.

Table VII

North Burbank Unit Oil Samples For Interfacial Tension Measurements≠

| | Reagent Quantities Used In Preparing Samples (grams) | | | | Compositions of Experimental Samples (Wt. %) | | | | |
|---|---|---|---|---|---|---|---|---|---|
| Sample No. | Salinity of Brine (WT. %) | NBU Crude | $RSO_3$ | IBA | Sample Weight | $H_2O$ | NBU Crude | $RSO_3$ | NaCl | IBA |
| 30 | 0.8 | SS* | SS* | SS* | 36.0 | 61.01 | 34.50 | 2.0 | 0.49 | 2.0 |
| 31 | 1.0 | * | * | * | 36.0 | 60.89 | 34.50 | 2.0 | 0.61 | 2.0 |
| 32 | 1.2 | * | * | * | 36.0 | 60.76 | 34.50 | 2.0 | 0.74 | 2.0 |
| 33 | 1.4 | * | * | * | 36.0 | 60.64 | 34.50 | 2.0 | 0.86 | 2.0 |
| 34 | 0.8 | a | a | a | 35.88 | 61.21 | 34.93 | 2.4 | 0.49 | 0.96 |
| 35 | 1.0 | a | a | a | 35.88 | 61.09 | 34.93 | 2.4 | 0.62 | 0.96 |
| 36 | 1.2 | a | a | a | 35.88 | 60.96 | 34.93 | 2.4 | 0.74 | 0.96 |
| 37 | 1.4 | a | a | a | 35.88 | 60.84 | 34.93 | 2.4 | 0.86 | 0.96 |
| 38 | 1.8 | a | a | a | 35.88 | 60.59 | 34.93 | 2.4 | 1.11 | 0.96 |
| 39 | 2.0 | a | a | a | 35.88 | 60.47 | 34.93 | 2.4 | 1.23 | 0.96 |
| 40 | 2.2 | a | a | a | 35.88 | 60.35 | 34.93 | 2.4 | 1.36 | 0.96 |

Table VII-continued

North Burbank Unit Oil Samples For Interfacial Tension Measurements≠

| | Reagent Quantities Used In Preparing Samples (grams) | | | | | Compositions of Experimental Samples (Wt. %) | | | | |
|---|---|---|---|---|---|---|---|---|---|---|
| Sample No. | Salinity of Brine (WT. %) | NBU Crude | RSO$_3$ | IBA | Sample Weight | H$_2$O | NBU Crude | RSO$_3$ | NaCl | IBA |
| 41 | 1.0 | b | b | b | 35.94 | 60.99 | 34.68 | 2.18 | 0.62 | 1.53 |
| 42 | 1.2 | b | b | b | 35.94 | 60.86 | 34.69 | 2.18 | 0.74 | 1.53 |
| 43 | 1.4 | b | b | b | 35.94 | 60.74 | 34.68 | 2.18 | 0.86 | 1.53 |
| 44 | 1.6 | b | b | b | 35.94 | 60.62 | 34.68 | 2.18 | 0.99 | 1.53 |

$^a$A 13.74 g aliquot of the oil solution was equilibrated with 22.14 g aliquots of the designated brine to give 35.88 g samples. The oil solution was prepared by combining 9.589 g Phillips sulfonate, 3.836 g isobutyl alcohol, and 139.256 g North Burbank crude oil.
$^b$A 13.80 g aliquot of the oil solution was equilibrated with 22.14 g aliquots of the designated brine to give 35.94 g samples. The oil solution was prepared by combining 7.848 g Phillips sulfonate, 5.50 g isobutyl alcohol, and 124.70 g North Burbank crude oil.
$^≠$A 22.14 g aliquot of brine was equilibrated with 13.86 g aliquots of oil solution (see * below) to prepare samples.
*A 13.86 g aliquot of stock oil solution was used in each sample. The stock oil solution was prepared by combining 7.2 g of Phillips sulfonate mixture, 7.2 g isobutyl alcohol, and 124.2 g North Burbank crude oil.

Table VIII

North Burbank Samples: Pseudocomponents and Interfacial Tensions
(I) Compositions of Pseudocomponents Based on Chemical Analysis

| | H$_2$O | NBU CRUDE | RSO$_3$ | NaCl | IBA |
|---|---|---|---|---|---|
| PS-1 | 0.0 | 0.9875 | 0.0025 | 0.0005 | 0.0095 (Top Phase) |
| PS-2 | 0.3345 | 0.5640 | 0.0785 | 0.0015 | 0.0215 (Middle Phase) |
| PS-3 | 0.960 | 0.0 | 0.0 | 0.0160 | 0.0240 (Bottom Phase) |

(II) Compositions of Pseudocomponents Derived by Gram-Schmidt Orthogonalization

| | H$_2$O | NBU CRUDE | RSO$_3$ | NaCl | IBA |
|---|---|---|---|---|---|
| PS-4 | 0.3972 | 0.4853 | −0.00 | 0.1030 | 0.0145 |
| PS-5 | 0.4246 | 0.5108 | 0.0175 | 0.0 | 0.0470 |

(III) Sample Compositions in Terms of Pseudocomponents and Interfacial Tensions

| Sample No. | Sample Compositions | | | | | Interfacial Tensions (dyne/cm) | | |
|---|---|---|---|---|---|---|---|---|
| | PS-1 | PS-2 | PS-3 | PS-4 | PS-5 | B-M# | M-T# | B-T# |
| 30 | 0.2372 | 0.2509 | 0.5744 | −0.0463 | −0.0162 | 0.000796 | 0.010223 | NM$^a$ |
| 31 | 0.2303 | 0.2508 | 0.5673 | −0.0332 | −0.0152 | 0.0018151 | 0.0055 | NM$^a$ |
| 32 | 0.2233 | 0.2508 | 0.5601 | −0.0201 | −0.0142 | 0.01715 | 0.000395 | NM$^a$ |
| 33 | 0.2164 | 0.2508 | 0.5530 | −0.0070 | −0.0132 | 0.02989 | NM$^a$ | NM$^a$ |
| 34 | 0.3674 | 0.3797 | 0.7020 | −0.0684 | −0.3807 | NM$^a$ | 0.00805 | NM$^a$ |
| 35 | 0.3604 | 0.3797 | 0.6949 | −0.0553 | −0.3797 | 0.000022 | 0.0052 | NM$^a$ |
| 36 | 0.3534 | 0.3797 | 0.6877 | −0.0422 | −0.3787 | 0.0007 | 0.003 | NM$^a$ |
| 37 | 0.3465 | 0.3797 | 0.6805 | −0.0290 | −0.3776 | 0.0009 | 0.0012 | NM$^a$ |
| 38 | 0.3325 | 0.3797 | 0.6662 | −0.0028 | −0.3756 | 0.0028 | 0.0001 | NM$^a$ |
| 39 | 0.3255 | 0.3796 | 0.6590 | 0.0103 | −0.3745 | 0.0051 | TLTM$^b$ | NM$^a$ |
| 40 | 0.3186 | 0.3796 | 0.6518 | 0.0235 | −0.3735 | 0.009 | TLTM$^b$ | NM$^a$ |
| 41 | 0.2892 | 0.3091 | 0.6252 | −0.0432 | −0.1804 | 0.0008 | 0.007597 | NM$^a$ |
| 42 | 0.2822 | 0.3091 | 0.6181 | −0.0301 | −0.1793 | 0.001308 | 0.0014319 | NM$^a$ |
| 43 | 0.2753 | 0.3091 | 0.6109 | −0.0170 | −0.1783 | 0.001848 | 0.00207 | NM$^a$ |
| 44 | 0.2683 | 0.3901 | 0.6038 | −0.0039 | −0.1773 | NM$^a$ | NM$^a$ | NM$^a$ |

$^a$NM represents not measured.
$^b$TLTM represents too low to measure.
B-M, M-T, and B-T represent, respectively, bottom-middle, middle-top, and bottom-top.

The optimal system in regard to minimal interfacial tensions are graphically determined in a contour plot of pseudocomponents PS-4 (A) and PS-5 (B) versus the experimentally determined interfacial tensions. The true compositions can then be determined by following the exemplary calculations hereinabove described.

The FIGURE is a contour plot made by computer analysis of the measured interfacial tension properties plotted against pseudocomponents A and B of the phenyltetradecane example hereinabove. The long (X) axis is the concentration of the first orthogonal pseudocomponent (A) and the short (Y) axis is the concentration of the second pseudocomponent (B). The third direction shows that minimum interfacial tension occurs in the region centered about A=0.014, B=0.195. It must be borne in mind that the minimum interfacial tension is the minimum for the largest of the three coexisting interfacial tensions.

We claim:

1. A process for determining the composition of at least one orthogonal pseudocomponent, changes in which effect a rapid change in an intensive physical property in a multicomponent fluid system having at least four components which system exhibits three phases in equilibrium, comprising:
    (1) analyzing each of said three phases of an actual system for the concentration of each of said at least four components or analyzing a plurality of such systems and obtaining a single value for the concentration of each of said at least four components by regression analysis; and
    (2) subjecting the results of the analysis for the concentration of each of said at least four components of (1) to Gram-Schmidt Orthogonalization to determine the composition of said at least one orthogonal pseudocomponent, the number of possible orthogonal pseudocomponents being equal to the number of true components minus three.

2. A process according to claim 1 comprising in addition
    (a) preparing actual samples corresponding to the original system of (1) having an altered amount of at least one of said pseudocomponents and measuring the intensive property in question; and (b) preparing additional samples having amounts of at least one of the pseudocomponents additionally varied in the direction that the analysis of (a) shows gives the desired change in the intensive property in question.

3. A method according to claim 2 wherein said preparation of (b) is carried out by preparing a contour plot using interpolation of actual data to prepare lines corresponding to a given value for the property so as to locate extrema in said measured intensive property.

4. A method according to claim 1 wherein said analysis of (1) is carried out on an actual sample.

5. A method according to claim 1 wherein said analysis of (1) is carried out on a series of samples which are combined by regression analysis.

6. A method according to claim 1 wherein said system contains five components and two orthogonal pseudocomponents are defined.

7. A method according to claim 6 wherein said at least four component system comprises hydrocarbon, water, electrolyte, surfactant, and cosurfactant.

8. A method according to claim 7 wherein said surfactant is petroleum sulfonate having an average equivalent weight of 375 to 500 and said cosurfactant is an alcohol having a solubility in water within the range of 0.5 to 20 grams per 100 grams of water and said electrolyte is predominantly NaCl present in an amount within the range of 2,000 to 50,000 ppm.

9. A method according to claim 8 wherein said alcohol is isobutyl alcohol.

10. A process fo recovering oil comprising:
(a) injecting into a subterranean oil bearing formation, a surfactant system selected by (1) equilibrating a mixture of oil corresponding to that in the reservoir to be produced, water, electrolyte, surfactant and cosurfactant such that the resulting equilibrated mixture forms three phases; (2) analyzing each of said three phases of either a representative actual sample or a plurality of actual samples which are subjected to regression analysis to give a composite sample for the concentration of said oil, water, electrolyte, surfactant, and cosurfactant; (3) subjecting the results of the analysis to a Gram-Schmidt Orthogonalization to determine the composition of at least one of the two possible orthogonal pseudocomponents; (4) preparing actual samples corresponding to the original system having altered amounts of at least one of said pseudocomponents and measuring the interfacial tension thereof; (5) preparing said surfactant system having an amount of at least one of the pseudocomponents varied in the direction to give lower interfacial tension;

(b) thereafter injecting a drive fluid to force said oil toward a production well; and recovering said oil.

11. A method according to claim 10 wherein said surfactant is a petroleum sulfonate having an equivalent weight within the range of 375 to 500 and said cosurfactant is an alcohol.

12. A method according to claim 11 wherein said measurements of interfacial tension after altering the system with said orthogonal pseudocomponent are plotted on a contour plot and the final composition chosen from said plot so as to give the minimum interfacial tension.

13. A method according to claim 11 wherein said analysis of said three phases is carried out on an actual system which is used directly.

14. A method according to claim 11 wherein said analysis of said three phases is carried out on a plurality of systems and a composite obtained by regression analysis.

* * * * *